(12) United States Patent
Bascetta et al.

(10) Patent No.: US 12,469,888 B1
(45) Date of Patent: Nov. 11, 2025

(54) BATTERY CONTROL SYSTEM THAT AUTOMATICALLY ELECTRICALLY ISOLATES BATTERY VOLTAGE FROM BATTERY OUTPUT CONNECTOR

(71) Applicant: United States of America as represented by the Secretary of the Navy, Arlington, VA (US)

(72) Inventors: Brandon Bascetta, Lynn Haven, FL (US); Jason Scott, Chipley, FL (US); Michael Kirke, Panama City, FL (US); James Mcginley, Lynn Haven, FL (US); Jonathan Outlaw, Lynn Haven, FL (US); Mike Hodges, Panama City, FL (US)

(73) Assignee: The United States of America as represented by the Secretary of the Navy

( * ) Notice: Subject to any disclaimer, the term of this patent is extended or adjusted under 35 U.S.C. 154(b) by 616 days.

(21) Appl. No.: 17/956,926

(22) Filed: Sep. 30, 2022

(51) Int. Cl.
| | |
|---|---|
| *H01M 10/46* | (2006.01) |
| *G01R 33/07* | (2006.01) |
| *H01M 10/42* | (2006.01) |
| *H01M 10/44* | (2006.01) |
| *H02J 7/00* | (2006.01) |

(52) U.S. Cl.
CPC .......... *H01M 10/425* (2013.01); *G01R 33/07* (2013.01); *H01M 10/441* (2013.01); *H02J 7/0063* (2013.01); *H02J 7/007* (2013.01); *H01M 2010/4271* (2013.01)

(58) Field of Classification Search
CPC ...... H02J 7/007; H02J 7/0063; H01M 10/441; H01M 10/425; H01M 2010/4271

USPC ................................. 320/107, 111, 114, 165
See application file for complete search history.

(56) References Cited

U.S. PATENT DOCUMENTS

| | | | |
|---|---|---|---|
| 2011/0156497 A1* | 6/2011 | Karren | H01M 10/48 307/139 |
| 2016/0336578 A1* | 11/2016 | Mack | H01M 50/591 |
| 2019/0120906 A1* | 4/2019 | Dan | G01R 19/0092 |
| 2021/0226187 A1* | 7/2021 | Karr | H01M 50/209 |

FOREIGN PATENT DOCUMENTS

| | | | |
|---|---|---|---|
| DE | 102018219478 A1 * | 5/2020 | B23K 11/11 |
| EP | 3709030 A1 * | 9/2020 | H01M 10/48 |

\* cited by examiner

*Primary Examiner* — Edward Tso
(74) *Attorney, Agent, or Firm* — James M. Kasischke; Jeffry C. Severson

(57) ABSTRACT

A battery control system has a switch circuit coupled between the battery and the battery output. A magnet is secured to an electrical connector that is connectable to the battery output. A processing element closes the switch circuit when a sensor detects a magnetic field and opens the switch circuit to electrically isolate the battery cell from the battery output connector when the sensor does not detect a magnetic field. When the electrical connector is connected to the battery output connector, the sensor detects the magnetic field produced by the magnet and outputs a signal that prompts the processing element to close the switch circuit. When the electrical connector is disconnected from the battery output, the sensor no longer detects the magnetic field and outputs a signal prompting the processing element to open the switch circuit.

18 Claims, 3 Drawing Sheets

BATTERY CONTROL SYSTEM THAT AUTOMATICALLY ELECTRICALLY ISOLATES BATTERY VOLTAGE FROM BATTERY OUTPUT CONNECTOR

STATEMENT OF GOVERNMENT INTEREST

Field of the Invention

The present invention relates to a battery control system that automatically electrically isolates the battery voltage from the battery output connector when an external electrical connector is disconnected from the battery output connector.

Background

Maritime batteries are often used underwater or in situations where the battery will be exposed to saltwater or other fluids. The battery has an output connector that is configured with conductive leads that provide the battery output voltage. The battery output connector is configured to be electrically connected to an external electrical connector of an external electrical cable. The external electrical cable is electrically coupled to a load. Typically, when the external electrical connector is disconnected from the battery output connector, the battery output voltage is still present at the conductive leads. Such a situation may cause the conductive leads to cross-conduct underwater in saltwater environments causing damage to the battery and possibly harming personnel.

What is needed is an apparatus that automatically terminates the battery voltage at the battery output connector when the external electrical connector is disconnected from the battery output connector.

SUMMARY

A summary of certain embodiments disclosed herein is set forth below. It should be understood that these aspects are presented merely to provide the reader with a brief summary of these certain embodiments and these aspects are not intended to limit the scope of this disclosure or the claimed subject matter. Indeed, this disclosure may encompass a variety of aspects that may not be set forth below.

Disclosed herein are embodiments of a battery control system that automatically electrically isolates the battery voltage from the battery output connector when an external electrical connector is disconnected from the battery output connector. The external electrical connector is electrically connected to an external electrical cable that provides the battery voltage to a load (e.g. device, machine or other apparatus). The battery has at least one battery cell that provides a battery voltage. The battery control system comprises a battery management circuit comprising battery cell switch circuitry that comprises at least one switch circuit. The switch circuit is coupled between the battery cell and the battery output connector and configurable to a first state in which the switch circuit couples the battery cell to the battery output connector so that the battery voltage is available at the battery output connector and to a second state in which the switch circuit electrically isolates the battery cell from the battery output connector. The battery management circuit further comprises an input for receiving a control signal that configures the switch circuit to either the first state or the second state. The battery control system further comprises a magnetic field generating device configured to be attached to an external electrical connector that is configured to be connected to the battery output connector. The battery control system further comprises a sensor for providing a detection signal that indicates whether or not a magnetic field is present. The battery control system further includes a processing element configured to receive the detection signal and, in response, output the control signal to the battery management circuit to configure the switch circuit to the first state if the detection signal indicates a magnetic field is present and to the second state if the detection signal indicates no magnetic field is present. When the external electrical connector having the magnetic field generating device is connected to the battery output connector, the sensor detects a magnetic field generated by the magnetic field generating device and outputs the detection signal indicating the presence of the magnetic field. When the external electrical connector having the magnetic field generating device is disconnected from the battery output connector, the sensor no longer detects the magnetic field and outputs a detection signal indicating the magnetic field is no longer present. In an exemplary embodiment, the magnetic field producing device comprises a magnet that is joined or attached to a non-ferromagnetic support member. In an exemplary embodiment, the magnet is joined to the non-ferromagnetic support member with an epoxy. In an exemplary embodiment, the sensor comprises a Hall Effect sensor.

DETAILED DESCRIPTION

Figure 1:
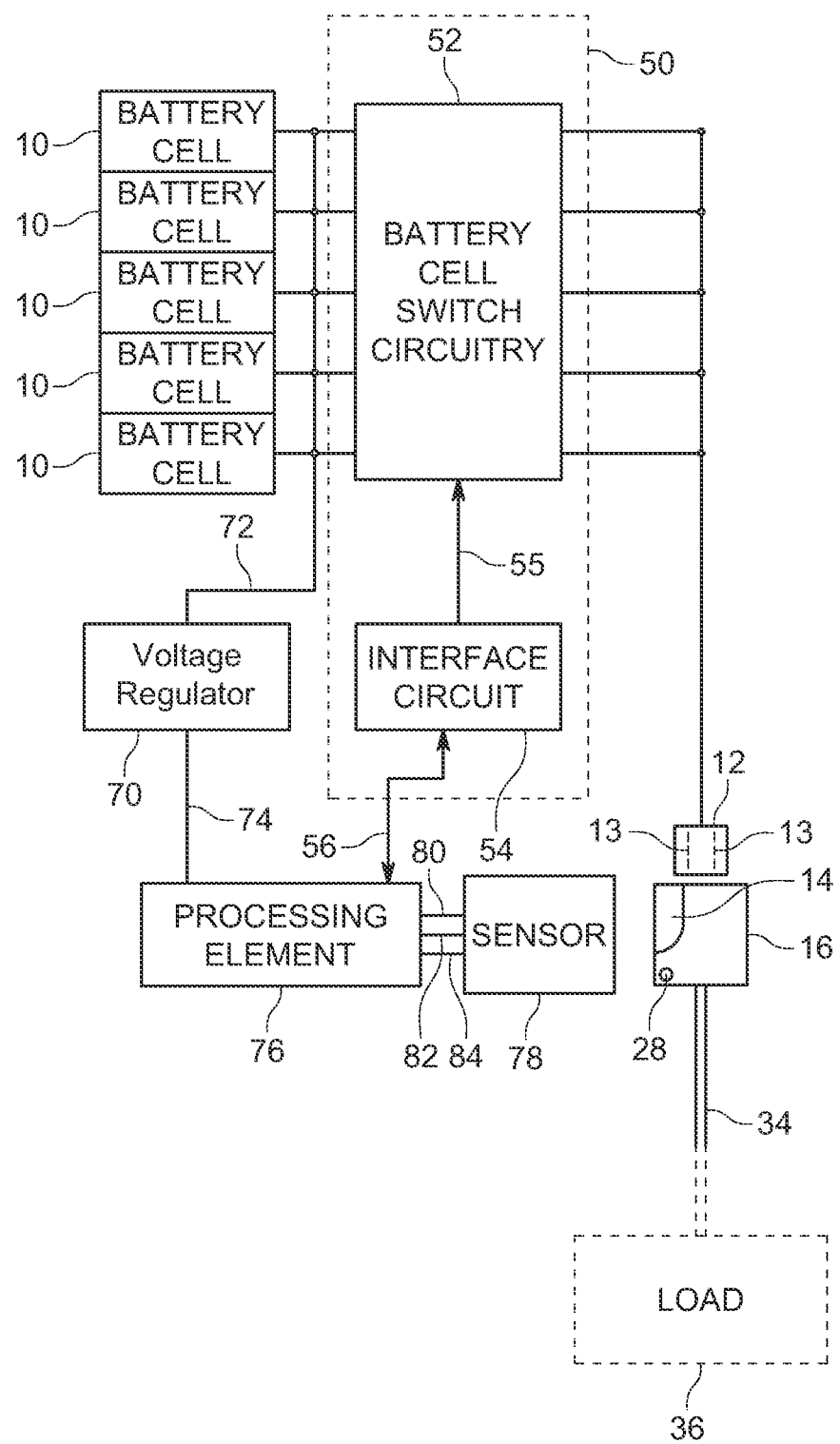
FIG. 1 illustrates an example block diagram of a battery control system that automatically electrically isolates the battery voltage from the battery output connector when an external electrical connector is disconnected from the battery output connector according to some embodiments.

As used herein, the terms "comprise", "comprising", "comprises", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

As used herein, terms such as "vertical", "horizontal", "top", "bottom", "base", "upper", "lower", "middle", "above", "below" and the like are used for convenience in identifying relative locations of various components and surfaces relative to one another in reference to the drawings and are not intended to be limiting in any way.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Reference in the specification to "an exemplary embodiment", "one embodiment," "an embodiment" or "some embodiments", means that a particular feature, structure or characteristic described in connection with the embodiment is included in at least one embodiment of the invention. The appearances of the phrases "an exemplary embodiment", "one embodiment", "embodiment" or "some embodiments" in various places in the specification are not necessarily all referring to the same embodiment.

"Processing element" refers to various components or combination of elements that are capable of performing a function in a device, such as a user device, machine or other apparatus. Processing elements may include, for example, processors and associated memory, portions or circuits of individual processor cores, entire processor cores, processor arrays, circuits such as an ASIC (Application Specific Integrated Circuit), programmable hardware elements such as a field programmable gate array (FPGA), as well as any combinations of the above.

"Automatically" refers to an action or operation performed by a device (e.g. circuitry, programmable hardware elements, ASICs, etc.) without user input directly specifying or performing the action or operation. Thus, the term "automatically" is in contrast to an operation being manually performed or specified by the user, where the user provides input to directly perform the operation.

Various components may be described as "configured to" perform a task or tasks. In such contexts, "configured to" is a broad recitation generally meaning "having structure that" performs the task or tasks during operation. As such, the component can be configured to perform the task even when the component is not currently performing the task (e.g. a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the tasks even when the component is not currently "on". In general, the circuitry that forms the structure corresponding to "configured to" may include hardware circuits. Various components may be described as performing a task or tasks, for convenience in the description. Such descriptions should be interpreted as including the phrase "configured to".

Figure 2:
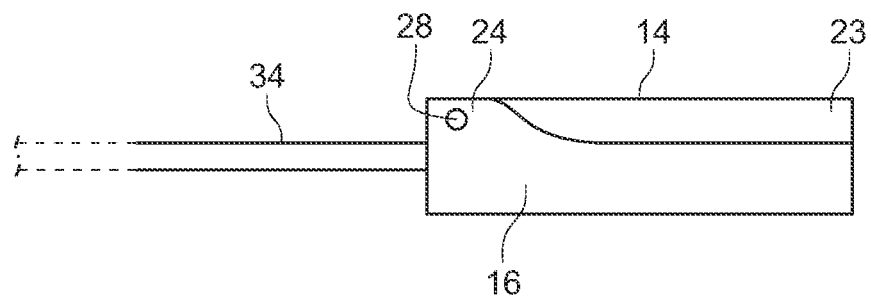
FIG. 2 illustrates a side view of an example external electrical connector having joined thereto a magnetic field producing device according to some embodiments.
Figure 3:
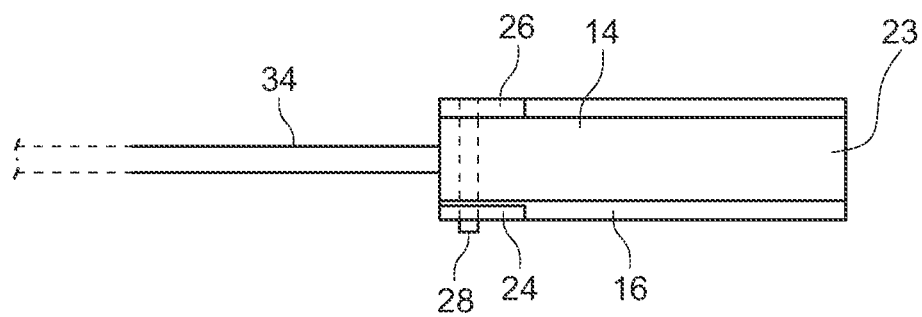
FIG. 3 is a top plan view of the external electrical connector having joined thereto the magnetic field producing device, both of which being shown in FIG. 2.
Figure 4:
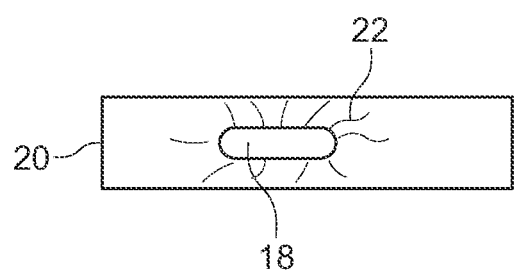
FIG. 4 illustrates example internal components of the magnetic field producing device according to some embodiments.

FIG. 1 is an example block diagram showing a battery control system that automatically electrically isolates the battery voltage from the battery output connector when an external electrical connector is disconnected from the battery output connector according to some embodiments. An example battery comprises a plurality of battery cells 10 and a battery output connector 12. Battery cells 10 provide a battery voltage that is available at battery output connector 12. Battery output connector 12 includes electrically conductive leads 13 (shown in phantom). As also shown in FIGS. 2-3, the battery control system comprises attachment 14 that is configured to be attached to external electrical connector 16. External electrical connector 16 is configured to be electrically connected to battery output connector 12. In some embodiments, attachment 14 comprises magnet 18 that is joined to support member 20 with potting material 22, as shown in FIG. 4. Magnet 18 may be any suitable magnet including, but not limited to, NdFeB, Alnico, Samarium Cobalt (SmCo) and Neodymium Iron Boron (NIB). Support member 20 is fabricated from non-ferromagnetic material. Suitable non-ferromagnetic materials include polyimide fiberglass, high-temperature polyimide films, liquid crystal polymer (LCP), polyester (PET), and polyethylene naphthalate (PEN). Any suitable electronic potting material may be used to pot magnet 18 to support member 20 such as epoxies, silicones and polyurethanes. Support member 20 and potted magnet 18 may be enclosed within casing 23. Casing 23 is fabricated from non-ferromagnetic materials. In some embodiments, casing 23 is fabricated from clear or transparent plastic. Attachment 14 is attached or joined to external electrical connector 16. In an exemplary embodiment, external electrical connector 16 has raised sections 24 and 26 that are spaced apart. Attachment 14 is positioned on external electrical connector 16 and positioned between raised sections 24 and 26 as shown in FIG. 3. Fastener 28 is used to attach the attachment 14 to the exterior surface of external electrical connector 16. In an exemplary embodiment, fastener 28 is a screw fabricated from non-ferromagnetic material. Fastener 28 extends through a threaded opening in raised section 24, and through casing 23 and through a threaded opening in raised section 26. As shown in FIG. 1, external electrical connector 16 is electrically connected to electrical cable 34. Electrical cable 34 is electrically connected to load 36 (shown in phantom). Load 36 is powered by the battery voltage and may be any device, piece of equipment or other apparatus.

It is to be understood that the shape and structure of external electrical connector 16 shown in FIGS. 2-4 are just examples and that external electrical connector 16 may be configured to have a different shape and structure. Furthermore, attachment 14 may be configured to be attached or joined to external electrical connector 16 by other suitable techniques or methods.

Figure 5:
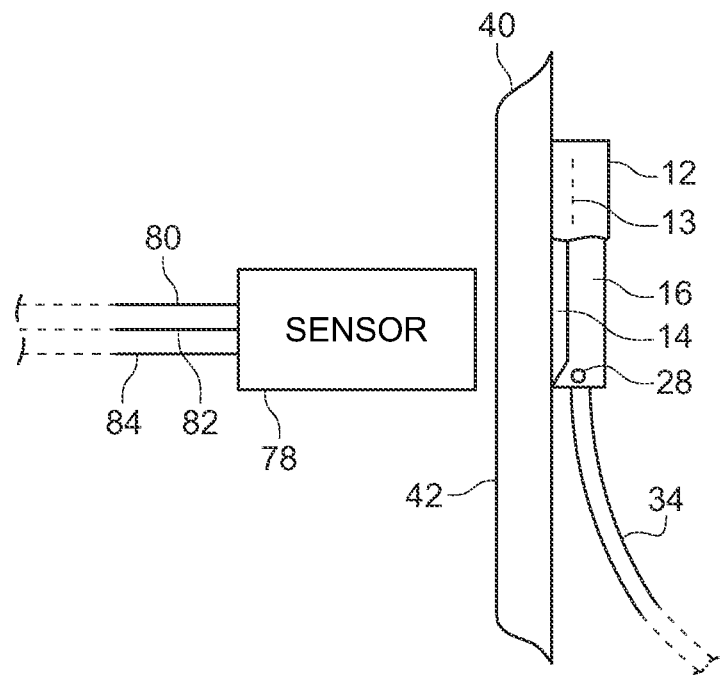
FIG. 5 illustrates the relative positions of a sensor, shown in FIG. 1, and the magnetic field producing device when the external electrical connector is connected to the battery output connector.

Referring to FIGS. 1 and 5, battery cells 10 are located within a watertight battery housing structure. The battery housing structure is not described herein in detail except for the following features which are now discussed. A portion of the battery housing structure is shown in FIG. 5 and is indicated by reference number 40. Housing 40 includes sidewalls, one of which being sidewall 42. Typically, sidewall 42 is relatively thin and has a thickness of about ⅛ inch. Housing 40 is fabricated from a non-ferromagnetic material. Suitable non-ferromagnetic materials include plastic, aluminum, copper or brass. Battery output connector 12 is attached or joined to the exterior side of sidewall 42. When external electrical connector 16 is connected to battery output connector 12, attachment 14 is adjacent to sidewall 42 (see FIG. 5).

Referring to FIG. 1, the battery control system of the present disclosure further comprises battery management circuit 50 which comprises battery cell switch circuitry 52 and interface circuit 54. Interface circuit 54 is in electronic signal communication with data signal communication bus 56. Bus 56 is described in detail in the ensuing description. Switch circuitry 52 comprises at least one switch circuit. In an exemplary embodiment, switch circuitry 52 comprises a plurality of switch circuits. Each switch circuit is coupled between a corresponding battery cell 10 and battery output connector 12. Interface circuit 54 outputs signal 55 that either closes or opens each switch circuit. Whether signal 55 closes or opens the switch circuits is determined by the signal that interface circuit 54 receives via data signal communication bus 56. When interface circuit 54 outputs signal 55 having a pre-determined minimum required voltage level, each switch circuit closes and electrically couples the corresponding battery cell 10 to battery output connector 12 thereby providing the battery voltage to battery output connector 12. When interface circuit 54 outputs signal 55 having a voltage level that is below the minimum required voltage level, each switch circuit opens so as to electrically isolate the corresponding battery cell 10 from the battery output connector 12. As a result, the battery voltage is no longer present at battery output connector 12.

Figure 6:
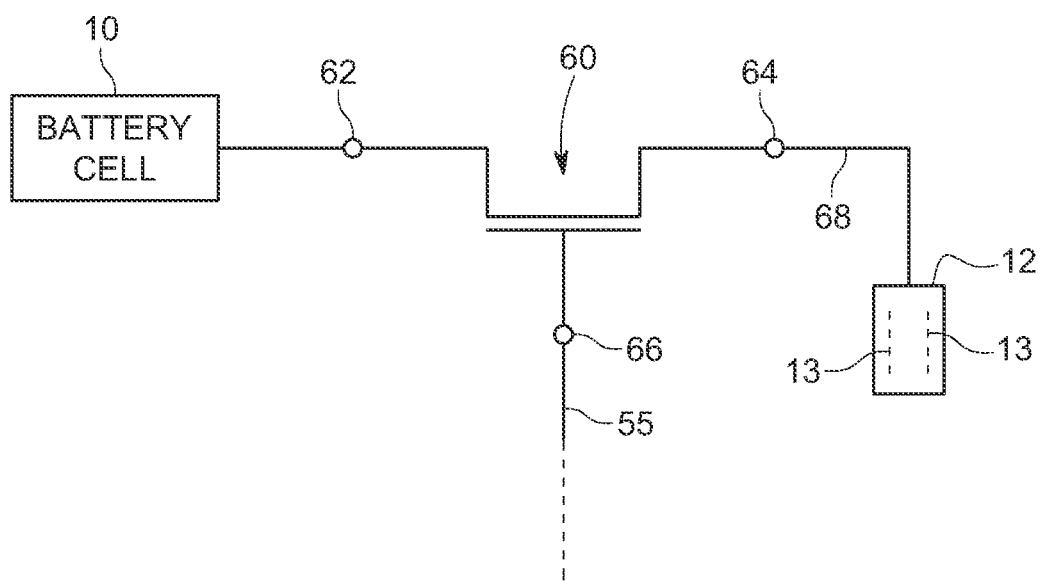
FIG. 6 illustrates an example switch circuit that may be used in the switching circuitry shown in FIG. 1 according to some embodiments.

In an exemplary embodiment, each switch circuit of switch circuitry 52 comprises a MOSFET which is configured to operate as a switch. Such an embodiment is illustrated in FIG. 6. In order to simplify the view of FIG. 6, only one MOSFET is shown. MOSFET 60 comprises source terminal 62, drain terminal 64 and gate terminal 66. Source terminal 62 is coupled to a corresponding battery cell 10 and drain terminal 64 is coupled to battery output connector 12. Specifically, conductive leads 13 of battery output connector 12 are electrically connected to drain terminal 64 via high-amperage rated wires 68. Gate terminal 66 receives signal 55 outputted by interface circuit 54. MOSFET 60 is turned "on" when signal 55 has a voltage level or magnitude that yields a VGs (gate-to-source voltage) that exceeds the threshold voltage VTH of the MOSFET. When MOSFET 60 is turned on, source terminal 62 is electrically coupled to drain terminal 64. As a result, the corresponding battery cell 10 is coupled to the battery output connector 12. MOSFET 60 is turned "off" when signal 55 has a voltage level or magnitude that produces a Vs (gate-to-source voltage) that is below the threshold voltage VTH of MOSFET 60. As a result, each MOSFET 60 is turned off such that the corresponding battery cell 10 is electrically isolated from battery output connector 12. As a result, the battery voltage is no longer present at battery output connector 12.

Referring to FIG. 1, voltage regulator 70 is coupled to battery voltage 72. Battery voltage 72 is the same voltage that is available at battery output connector 12 when the switch circuits are turned "on". Voltage regulator 70 steps down battery voltage 72 to lower voltage 74 that powers processing element, 76. For example, lower voltage 74 may be about 5.0 VDC. In an exemplary embodiment, processing element 76 comprises a microprocessor that is realized by an Arduino chip Sensor 78 is in electrical signal communication with processing element 76. Sensor 78 is configured to sense or detect magnetic fields. In some embodiments, sensor 78 is a Hall Effect sensor. Sensor 78 is coupled to the electrical ground input of processing element 76 via electrical connection 80. Sensor 78 is also coupled to the $V_{CC}$ input of processing element 76 via electrical connection 82. Sensor 78 outputs a detection signal to processing element 76 over electrical connection 84. The detection signal is a high level voltage signal (e.g. between about 3.0-5.0 VDC) if sensor 78 detects a magnetic field. If sensor 78 does not detect any magnetic field, the detection signal is a low level voltage signal (e.g. between about 0.0-0.5 VDC). As shown in FIG. 1, processing element 76 is in electronic signal communication with data signal communication bus 56. In an exemplary embodiment, data signal communication bus 56 is configured as an $I^2C$ synchronous, multi-controller/multi-target, packet switched, single ended serial communication bus. Bus 56 includes an electrical ground line, a data signal line and a clock pulse signal. The clock pulses and electrical ground must be synced between processing element 76 and interface circuit 54 in order to enable proper communication between processing element 76 and battery management circuit 50. The data signal line of bus 56 carries the signal that controls battery management circuit 50 to turn switch circuitry 52 either on or off. Specifically, the data signal line of bus 56 is inputted into interface circuit 54 which, in response, outputs signal 55 that either turns switch circuitry 52 on or off.

In an exemplary embodiment, battery management circuit 50 is mounted to a first printed circuit board (PCB) (not shown) that is positioned within the interior of the battery housing. Voltage regulator 70, processing element 76 and sensor 78 are mounted to a second printed circuit board (PCB) (not shown) that is also positioned within the interior of the battery housing. The second printed circuit board is positioned so that sensor 78 is adjacent to the interior side of sidewall 42 and in proximity to battery output connector 12 which is attached to the exterior side of sidewall 42. FIG. 5 illustrates the position of sensor 78 relative to battery output connector 12. When external electrical connector 16 is electrically connected to battery output connector 12, attachment 14 is adjacent to the exterior side of sidewall 42. Magnet 18 on attachment 14 produces a magnetic field that is sensed by sensor 78. Since the battery housing is fabricated from a non-ferromagnetic material (e.g. Aluminum) and sidewall 42 is relatively thin (e.g. ⅛ inch), sidewall 42 does not interfere with the ability of sensor 78 to detect the magnetic field. In response to the presence of the magnetic field, sensor 78 outputs a high level voltage signal to processing element 76. Processing element 76 then outputs a data signal on the data signal line of data signal bus 56 that prompts interface circuit 54 to output signal 55 that produces a VGs (gate-to-source voltage) for each MOSFET 60 that exceeds the threshold voltage VTH of the MOSFET, thereby turning on all MOSFETS 60. Once each MOSFET 60 is turned on, the voltage provided by the corresponding battery cell 10 is coupled to battery output connector 12. As a result, the battery voltage is now present at leads 13 of battery output connector 12 and is provided to load 36 via external electrical connector 16 and electrical cable 34.

When external electrical connector 16 is disconnected from battery output connector 12, attachment 14 is no longer adjacent to sidewall 42 and the magnetic field is removed. Consequently, sensor 78 no longer senses a magnetic field and outputs a low level voltage signal to processing element 76. In response, processing element 76 outputs a data signal on the data signal line of bus 56 that prompts interface circuit 54 to output signal 55 with a magnitude that causes the VGs (gate-to-source voltage) of each MOSFET 60 to fall below the threshold voltage VTH of the MOSFET. As a result, all MOSFETS 60 are turned off thereby electrically isolating battery cells 10 from battery output connector 12. As a result, the battery voltage is no longer present at battery output connector 12.

When external electrical connector 16 is re-connected to battery output connector 12, attachment 14 is once again adjacent to the exterior side of sidewall 42. Sensor 78 senses the magnetic field produced by magnet 18 and, in response, outputs a high-level voltage signal to processing element 76. In response, processing element 76 outputs a data signal on the data signal line of bus 56 that prompts interface circuit 54 to output signal 55 having a magnitude sufficient to turn on all MOSFETS 60 so each battery cell 10 is coupled to battery output connector 12 and the battery voltage is present at battery output connector 12.

Although the foregoing description is in terms of sensor 78 being positioned adjacent to sidewall 42, it is to be understood that in view of the relatively thin sidewall 42, sensor 78 may be positioned up to about 2.0 inches away from sidewall 42.

The battery control system of the present invention promptly and automatically terminates the battery output voltage upon disconnection of external electrical connector 16, thereby eliminating the problems and dangers resulting from the cross-conduction of the battery's conductive output leads 13 in a salt water environment. The battery control system of the present invention may be inexpensively manufactured and assembled since all components are commercially available. Battery management circuit 50 may be assembled on a separate printed circuit board as described in the foregoing description. In other embodiments, battery management circuit 50, voltage regulator 70, processing element 76 and sensor 78 are all assembled on the same printed circuit board. The battery control system of the present invention may be used with any one of a variety of batteries including, but not limited to, Lithium-ion, Lithium Cobalt Oxide (LCO), Lithium Manganese oxide (LMO), Lithium Iron Phosphate (LFP), Sealed Valve-Regulated (SVR) Gelled-Electrolyte and Sealed Valve-Regulated Absorbed Glass Mat (AGM).

The foregoing description of illustrated embodiments of the subject invention, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A battery control system for a battery having at least one battery cell that provides a battery voltage and a battery output connector for providing the battery voltage to a load, comprising:
    a battery management circuit having battery cell switch circuitry comprising at least one switch circuit coupled between the at least one battery cell and configurable to a first state in which the switch circuit couples the at least one battery cell to the battery output connector and to a second state in which the switch circuit electrically isolates the battery cell from the battery output connector, the battery management circuit including an input for receiving a control signal that configures the switch circuit to either the first state or the second state;
    a magnetic field generating device configured to be attached to an external electrical connector that is configured to be electrically connected to the battery output connector;
    a sensor configured to provide a detection signal indicating whether or not a magnetic field is present; and
    a processing element configured to receive the detection signal and, in response, output the control signal to the battery management circuit to configure the switch circuit to the first state if the detection signal indicates the presence of the magnetic field and to the second state if the detection signal indicates no magnetic field is present;
    whereby, when the external electrical connector with the magnetic field generating device attached thereto is connected to the battery output connector, the sensor detects a magnetic field generated by the magnetic field generating device and outputs the detection signal indicating the presence of the magnetic field, and whereby when the external electrical connector with the magnetic field generating device attached thereto is disconnected from the battery output connector, the sensor outputs a detection signal indicating the magnetic field is no longer present.

2. The battery control system according to claim 1 wherein the magnetic field producing device comprises a magnet.

3. The battery control system according to claim 2 wherein the magnetic field producing device further comprises a support member and wherein the magnet is joined to the support member.

4. The battery control system according to claim 1 wherein the sensor comprises a Hall Effect sensor.

5. The battery control system according to claim 1 further comprising a voltage regulator circuit configured to step down the battery voltage to a lower voltage suitable for powering the processing element.

6. The battery control system according to claim 1 wherein the at least one battery cell comprises a plurality of battery cells and the battery cell switch circuitry comprises a plurality of switch circuits, each of which being coupled between a corresponding battery cell and the battery output connector.

7. The battery control system according to claim 1 wherein the battery management circuit further comprises an interface circuit in electronic signal communication with the battery cell switch circuitry and the processing element, the interface circuit being configured to receive the control signal from the processing element and in response, generate a signal that configures the switch circuit to either the first state or the second state.

8. The battery control system according to claim 7 further comprising a synchronous serial communication bus in electronic signal communication with the processing element and the interface circuit.

9. The battery control system according to claim 7 wherein the switch circuit comprises a MOSFET having a source terminal coupled to the battery cell, a drain terminal coupled to the battery output connector and a gate coupled to the signal outputted by the interface circuit.

10. The battery control system according to claim 7 wherein the at least one battery cell comprises a plurality of battery cells and the battery cell switch circuitry comprises a plurality of switch circuits, each of which comprises a MOSFET having a source terminal coupled to a corresponding battery cell, a drain terminal coupled to the battery output connector and a gate coupled to the signal outputted by the interface circuit.

11. A battery control system for a battery having at least one battery cell that provides a battery voltage and a battery output connector for providing the battery voltage to a load, comprising:

a battery management circuit comprising:
  battery cell switch circuitry comprising at least one switch circuit coupled between the at least one battery cell and configurable to a first state in which the switch circuit couples the battery cell to the battery output connector and to a second state in which the switch circuit electrically isolates the battery cell from the battery output connector, and
  an interface circuit configured to receive a control signal and in response, generate a signal that configures the switch circuit to either the first state or the second state;
a magnetic field generating device configured to be attached to an external electrical connector that is configured to be connected to the battery output connector;
a sensor for providing a detection signal that indicates whether or not a magnetic field is present;
a synchronous serial communication bus in electronic signal communication with the interface circuit of the battery management circuit; and
a processing element in electronic signal communication with the synchronous serial communication bus and the sensor and configured to receive the detection signal from the sensor and, in response, output the control signal to the interface circuit via the synchronous serial communication bus to prompt the interface circuit to output a signal that configures the switch circuit to the first state if the detection signal indicates the presence of a magnetic field and to the second state if the detection signal indicates no magnetic field is present;
whereby, when the external electrical connector with the magnetic field generating device attached thereto is connected to the battery output connector, the sensor detects a magnetic field generated by the magnetic field generating device and outputs the detection signal indicating the presence of the magnetic field, and whereby when the external electrical connector with the magnetic field generating device attached thereto is disconnected from the battery output connector, the sensor outputs a detection signal indicating the magnetic field is no longer present.

12. The battery control system according to claim 11 wherein the sensor comprises a Hall Effect sensor.

13. The battery control system according to claim 11 wherein the at least one battery cell comprises a plurality of battery cells and the battery cell switch circuitry comprises a plurality of switch circuits, wherein each switch circuit is coupled between a corresponding battery cell and the battery output connector.

14. The battery control system according to claim 11 wherein the switch circuit comprises a MOSFET having a source terminal coupled to the battery cell, a drain terminal coupled to the battery output connector and a gate coupled to the signal outputted by the interface circuit.

15. The battery control system according to claim 11 further comprising a voltage regulator circuit configured to step down the battery voltage to a lower voltage suitable for powering the processing element.

16. A battery control system for a battery having at least one battery cell that provides a battery voltage and a battery output connector for providing the battery voltage to a load, comprising:
a battery management circuit comprising:
  battery cell switch circuitry comprising a switch circuit coupled between the at least one battery cell and configurable to a first state in which the switch circuit couples the battery cell to the battery output connector and to a second state in which the switch circuit electrically isolates the battery cell from the battery output connector, and
  an interface circuit configured to receive a control signal and in response, generate a signal that configures the switch circuit to either the first state or the second state;
an attachment comprising a magnet and configured to be attached to an external electrical connector that is configured to be connected to the battery output connector;
a Hall Effect sensor for providing a detection signal that indicates whether or not a magnetic field is present; and
a processing element in electronic signal communication with the Hall Effect sensor and the interface circuit and configured to receive the detection signal from the sensor and, in response, output the control signal to the interface circuit to prompt the interface circuit to output a signal that configures the switch circuit to the first state if the detection signal indicates the presence of a magnetic field and to the second state if the detection signal indicates no magnetic field is present;
whereby, when the external electrical connector with the attachment is connected to the battery output connector, the sensor detects a magnetic field generated by the magnet and outputs the detection signal indicating the presence of the magnetic field, and whereby when the external electrical connector with the attachment is disconnected from the battery output connector, the sensor outputs a detection signal indicating the magnetic field is no longer present.

17. The battery control system according to claim 16 wherein the at least one battery cell comprises a plurality of battery cells and the battery cell switch circuitry comprises a plurality of switch circuits, wherein each switch circuit is coupled between a corresponding battery cell and the battery output connector.

18. The battery control system according to claim 16 wherein the least one battery cell comprises a plurality of battery cells and the battery cell switch circuitry comprises a plurality of switch circuits, wherein each switch circuit comprises a MOSFET having a source terminal coupled to the battery cell, a drain terminal coupled to the battery output connector and a gate coupled to the signal outputted by the interface circuit.

* * * * *